US012620602B2

(12) United States Patent
Kang et al.

(10) Patent No.: US 12,620,602 B2
(45) Date of Patent: May 5, 2026

(54) SUBMARINE POWER SUPPLY SYSTEM AND POWER SUPPLY METHOD USING SEAWATER BATTERY

(71) Applicant: KOREA INSTITUTE OF OCEAN SCIENCE & TECHNOLOGY, Busan (KR)

(72) Inventors: Hee Jin Kang, Gyeryong-si (KR); Young Shik Kim, Daejeon (KR); Yun Ho Kim, Daejeon (KR); Jang Pyo Hong, Daejeon (KR)

(73) Assignee: KOREA INSTITUTE OF OCEAN SCIENCE & TECHNOLOGY, Busan (KR)

( * ) Notice: Subject to any disclaimer, the term of this patent is extended or adjusted under 35 U.S.C. 154(b) by 595 days.

(21) Appl. No.: 18/003,406

(22) PCT Filed: Sep. 9, 2020

(86) PCT No.: PCT/KR2020/012172
§ 371 (c)(1),
(2) Date: Dec. 27, 2022

(87) PCT Pub. No.: WO2022/050470
PCT Pub. Date: Mar. 10, 2022

(65) Prior Publication Data
US 2023/0253575 A1 Aug. 10, 2023

(30) Foreign Application Priority Data
Sep. 3, 2020 (KR) ........................ 10-2020-0112680

(51) Int. Cl.
*H01M 6/34* (2006.01)
*B63G 8/08* (2006.01)
*H01M 6/02* (2006.01)
*H01M 6/50* (2006.01)

(52) U.S. Cl.
CPC ................ *H01M 6/34* (2013.01); *B63G 8/08* (2013.01); *H01M 6/02* (2013.01); *H01M 6/50* (2013.01); *H01M 2220/20* (2013.01)

(58) Field of Classification Search
CPC ............ H01M 6/34; H01M 6/02; H01M 6/50; H01M 2220/20; B63G 8/08
See application file for complete search history.

(56) References Cited

U.S. PATENT DOCUMENTS

| | | | | |
|---|---|---|---|---|
| 5,376,471 A | * | 12/1994 | Hunter | ................... H01M 6/50 429/81 |
| 2003/0197484 A1 | * | 10/2003 | Kotlow | .................... H02J 7/14 320/104 |
| 2006/0150887 A1 | * | 7/2006 | Liang | .................... B63H 13/00 114/312 |

FOREIGN PATENT DOCUMENTS

JP 2014218240 A * 11/2014

OTHER PUBLICATIONS

EPO machine generated English translation of JP-2014218240-A (Year: 2014).*

* cited by examiner

*Primary Examiner* — Kimberly Wyluda

(57) ABSTRACT

Proposed are a submarine power supply system and power supply method using a seawater battery, the system having a chargeable/dischargeable battery that is arranged on the outside of a pressure hull, so as to use, as a cathode, sodium ions dissolved in seawater, and thus produce electric power, which is then used as electric power required for operating a submarine.

4 Claims, 4 Drawing Sheets

SEAWATER INLET ROOM
(BETWEEN PRESSURE HULL AND OUTER HULL)

ENGINE/CONTROL ROOM
ELECTRIC MOTOR
OPERATION/RESIDENTIAL ROOM
STORAGE ROOM
ARMED/RESIDENTIAL ROOM

OUTER HULL

PRESSURE HULL

BATTERY AND FUEL CELL MOUNTING ROOM
(INSIDE PRESSURE HULL)

<u>120</u>

(a)

(b)

(c)

SUBMARINE POWER SUPPLY SYSTEM AND POWER SUPPLY METHOD USING SEAWATER BATTERY

TECHNICAL FIELD

The present disclosure relates to a submarine power supply system and a submarine power supply method, the system and the method using a seawater battery. More specifically, the present disclosure relates to a submarine power supply system and a submarine power supply method, the system and the method using a seawater battery, and the system and the method having a chargeable/dischargeable battery that is arranged on the outside of a pressure hull so as to use sodium ions dissolved in seawater as a cathode, thereby producing electric power which is then used as electric power required for operating a submarine.

BACKGROUND ART

In a submarine, a battery or a fuel cell is mounted and used so as to reduce noise in water and to perform air-independent propulsion. The battery or the fuel cell mounted and used in the submarine is mounted inside a pressure hull for performing an operation or a work in deep water having a depth equal to or more than 300 m. Accordingly, a crew member bedroom, a living space, an operation space, a device mounting space for an armament, and so on disposed inside the pressure hull of the submarine are significantly restricted.

In addition, a battery and a fuel cell system mounted in the submarine is constantly exposed to the risk of fire and explosion due to defects of the system, operational errors of the system, and damage from a torpedo and so on. A lithium-ion battery generates oxygen in the event of a fire, so that the fire is difficult to be extinguished. Furthermore, when a fire occurs, harmful gas is emitted, so that a crew member's life is seriously endangered. In addition, in a fuel cell, the fuel cell uses fuels such as hydrogen and so on that are explosive, and there is a problem that the fuel cell is sensitive to temperature conditions during operating the fuel cell.

DISCLOSURE

Technical Problem

An objective of the present disclosure is to provide a submarine power supply system and a submarine power supply method, the system and the method using a seawater battery, and the system and the method having a chargeable/dischargeable battery that is arranged on the outside of a pressure hull so as to use sodium ions dissolved in seawater as a cathode, thereby producing electric power which is then used as electric power required for operating a submarine.

In addition, another objective of the present disclosure is to provide a submarine power supply system and a submarine power supply method, the system and the method using a seawater battery, and the system and the method being capable of replacing a battery system or a fuel cell system which has a risk of fire or explosion and which occupies a large space since the battery system or the fuel cell system is mounted inside a pressure hull so as to perform an underwater movement, an operation, and a work of a submarine.

In addition, still another objective of the present disclosure is to provide a submarine power supply system and a submarine power supply method, the system and the method using a seawater battery, the system and the method being configured such that the seawater battery is mounted outside a pressure hull and electric power is supplied from the seawater battery so that a space used for mounting a battery and a fuel cell inside the pressure hull is capable of being sufficiently utilized as a space for a crew member's living space and a device arrangement for an armament, and the system and the method being capable of fundamentally resolving the risk or fire, explosion, and toxic/harmful gas generation that may occur during operating the battery and the fuel cell.

Technical Solution

According to an embodiment of the present disclosure, there is provided a submarine power supply system using a seawater battery, the system including: an anode array formed of at least one anode line disposed at a predetermined interval along a longitudinal direction of an outer side surface of a pressure hull between an outer hull and the pressure hull of a submarine, and wherein, as the anode array is formed such that seawater introduced through a space between the outer hull and the pressure hull is in contact with the anode array, electric power generated by sodium ions accumulated according to a contact between the seawater and the anode line may be gathered, t thereby providing the electric power as electric power required for propelling the submarine.

According to an embodiment of the present disclosure, the system may further include: a cleaning means configured to move along a longitudinal direction of the anode array between the outer hull and the pressure hull, thereby cleaning foreign substances attached to the anode array; and a pair of guide rails provided along both side end portions of the anode array, the pair of guide rails guiding the cleaning means to be capable of being moved along the longitudinal direction of the anode array.

According to an embodiment of the present disclosure, the cleaning means may include: at least one anode cleaning hole formed such that the at least one anode cleaning hole corresponds to a position of each anode provided on the anode line; a cleaning apparatus provided for each anode cleaning hole; a foreign substance suction portion configured to suction and store foreign substances removed by the cleaning apparatus; at least one wheel engaged with the pair of guide rails and configured to be rotated so as to move the cleaning means forward or backward; a rotation motor configured to rotate the at least one wheel; a camera configured to capture the anode array in real time; a lighting device configured to shine light to the anode array; an electromagnet applying electromagnetic force so that the cleaning means is capable of being attached to the pressure hull; and a battery configured to supply electric power to the cleaning apparatus, the foreign substance suction portion, the rotation motor, the camera, and the lighting device.

According to an embodiment of the present disclosure, the anode array may be electrically connected to an emergency battery provided inside the pressure hull, and the emergency battery may be charged by using electric power generated and gathered through the anode array.

According to another embodiment of the present disclosure, there is provided a submarine power supply method using a seawater battery, the method including: a contacting process in which seawater introduced through a space between an outer hull and a pressure hull of a submarine is in contact with an anode array that is formed of at least one anode line disposed at a predetermined interval along a longitudinal direction of an outer side surface of the pressure hull between the outer hull and the pressure hull; and a supplying process in which electric power is generated as the seawater and the anode line are in contact with each other and sodium ions are accumulated, and a generated electric power is gathered and then is provided as electric power required for propelling the submarine.

Advantageous Effects

According to the present disclosure, there is an advantage that the chargeable/dischargeable seawater battery is arranged on the outside of the pressure hull so as to use sodium ions dissolved in seawater as a cathode, thereby producing electric power which is then used as electric power required for operating a submarine.

In addition, according to an aspect of the present disclosure, there is an advantage that a battery system or a fuel cell system is capable of being replaced, the battery system or the fuel cell system having a risk of fire or explosion and occupying a large space since the battery system or the fuel cell system is mounted inside a pressure hull so as to perform an underwater movement, an operation, and a work of a submarine.

In addition, according to an aspect of the present disclosure, there is an advantage that the risk of fire, explosion, and toxic/harmful gas generation that may occur during operating the battery and the fuel cell are capable of being fundamentally resolved, and the space used for mounting the battery and the fuel cell inside the pressure hull is capable of being sufficiently utilized as the space for a crew member's living space and a device arrangement for an armament since the seawater battery is mounted outside the pressure hull and electric power is supplied from the seawater battery.

In addition, according to an aspect of the present disclosure, as the anode is arranged on the outside of the pressure hull and is in contact with seawater, electric power is generated by a chemical reaction, and a service electric power for moving and standby the submarine in water and for operating the device is supplied. Therefore, the present disclosure has an advantage that electric power is generated by reacting the anode with seawater over a large area since the anode is disposed on a space outside the pressure hull having a relatively large surface area.

DESCRIPTION OF REFERENCE NUMERALS

Figure 1:
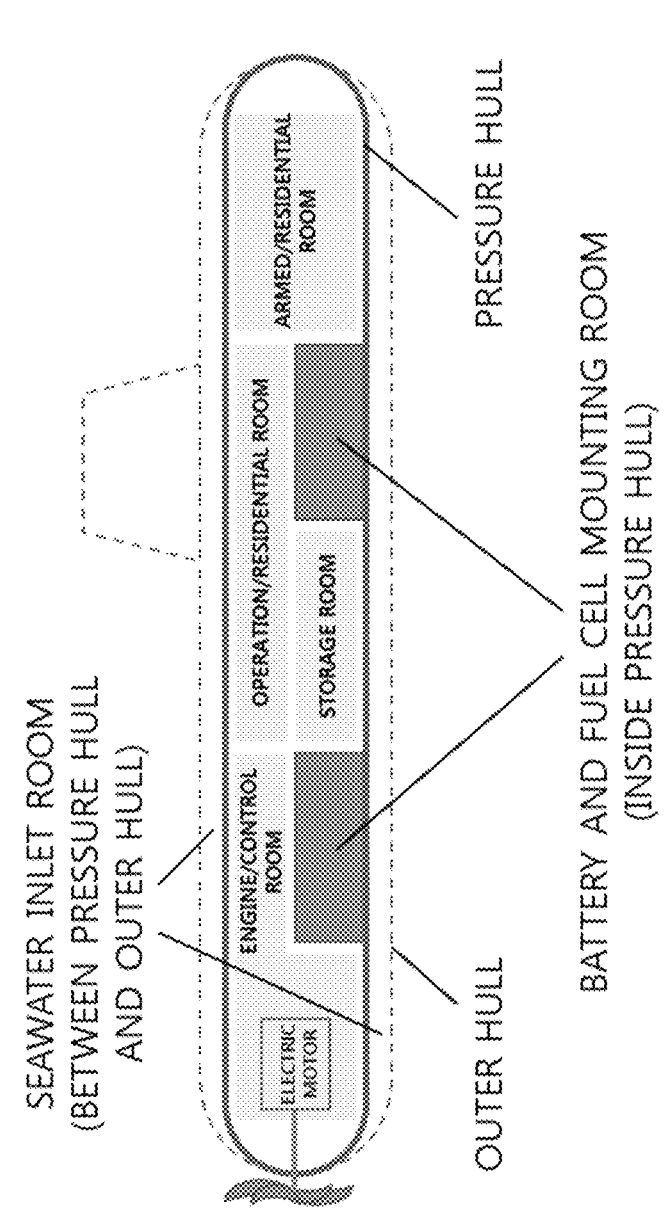
FIG. 1 is a view illustrating a layout of a battery and a fuel cell of a conventional submarine.

100: submarine power supply system using seawater battery
110: anode array
120: cleaning means
121: anode cleaning hole
122: cleaning apparatus
123: foreign substance suction portion 124: wheel
125: rotation motor
126: camera
127: lighting device
128: electromagnet
129: battery
130: guide rail

BEST MODE

Hereinafter, exemplary embodiments will be described to aid in understanding of the present disclosure. However, the following embodiments are provided only to facilitate the understanding of the present disclosure and are not intended to limit the scope of the present disclosure.

FIG. 1 is a view illustrating a layout of a battery and a fuel cell of a conventional submarine.

Referring to FIG. 1, in the layout of the battery and the fuel cell of the conventional submarine, as the battery and the fuel cell are all disposed inside a pressure hull to withstand water pressure of deep water, there is a limitation in utilizing a space, evacuation of crew members is impossible in the event of a fire and, particularly, there is a risk that the crew members are exposed to harmful gas emissions and so on.

Figure 2:
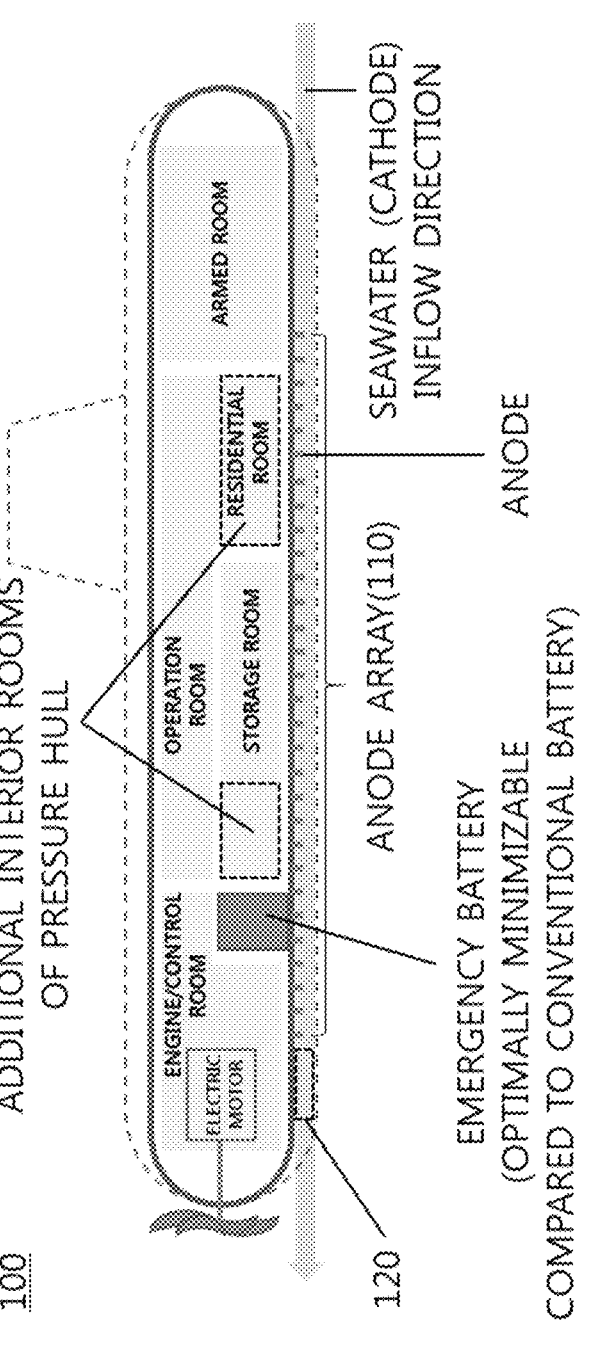
FIG. 2 is a view illustrating a submarine power supply system 100 using a seawater battery according to an embodiment of the present disclosure.
Figure 3:
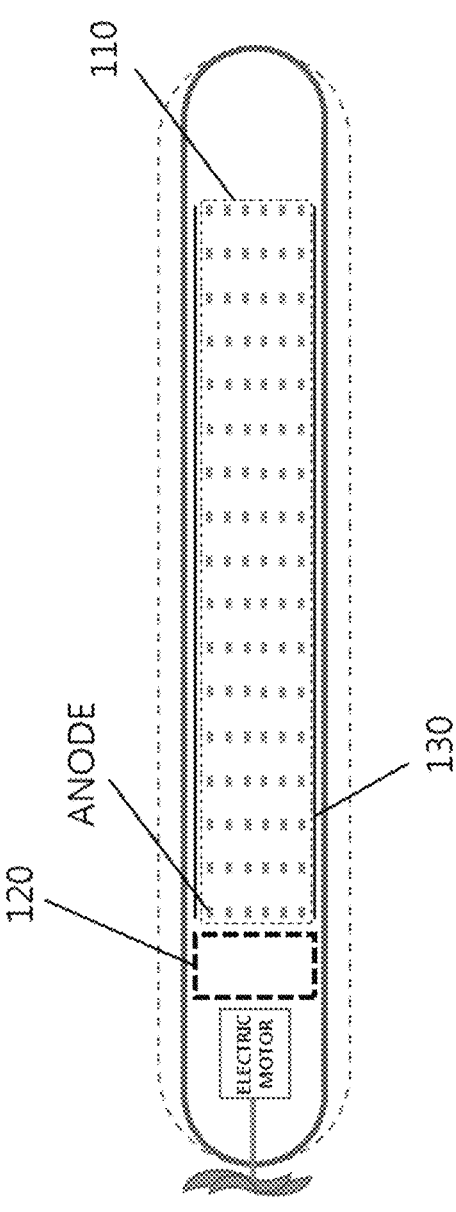
FIG. 3 is a view more specifically illustrating an anode array 110 illustrated in FIG. 2.

FIG. 2 is a view illustrating a submarine power supply system 100 using a seawater battery according to an embodiment of the present disclosure, and FIG. 3 is a view specifically illustrating an anode array 110 illustrated in FIG. 2.

Referring to FIGS. 2 and 3, the submarine power supply system 100 using the seawater battery according to an embodiment of the present disclosure includes the anode array 110 formed of at least one anode line disposed at a predetermined interval along a longitudinal direction of an outer side surface of a pressure hull between an outer hull and the pressure hull of the submarine.

More specifically, as the anode array 110 is formed such that seawater introduced through a space between the outer hull and the pressure hull is in contact with the anode array 110, electric power generated by sodium ions accumulated according to the contact between seawater and the anode line is gathered, thereby providing the electric power as electric power required for propelling the submarine.

The anode array 110 is formed of at least one anode line disposed at the predetermined interval along a longitudinal direction of the pressure hull from a lower side surface of the pressure hull, and the anode array 110 is arranged in a line type so that the anode array 110 is in contact with seawater which is introduced through the outer hull and the pressure hull and which corresponds to a cathode but the anode array 110 does not affect a hydrodynamic performance of the submarine. At this time, as a separate cathode is not disposed in the submarine except for the anode, the anode array 110 is disposed in a large area on a lower surface of the pressure hull as much as the required amount of electric power. Therefore, as electric power generated by sodium ions accumulated on each anode disposed in the anode array 110 is gathered, the electric power may be utilized as propulsion power and service power of the submarine by providing the electric power to an electric motor provided in the submarine.

Meanwhile, as the anode array 110 is directly in contact with seawater, the anode array 110 may be contaminated when marine organisms are attached to the anode array 110 or foreign substances are attached and stuck to the anode array 110, so that the present disclosure may further include a cleaning means 120 for cleaning the marine organisms and the foreign substances. The cleaning means 120 will be described with reference to FIGS. 4a to 4c.

Figure 4:
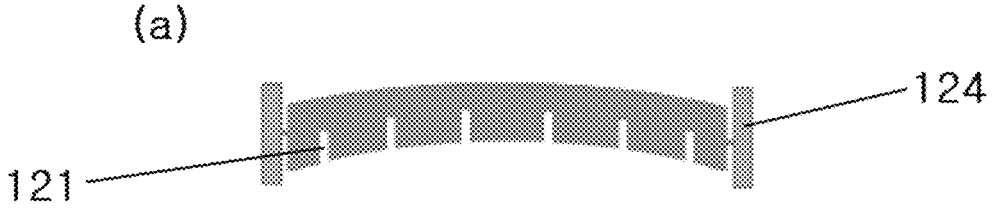
FIG. 4 more specifically shows a cleaning means 120 illustrated in FIG. 2.
Figure 4:
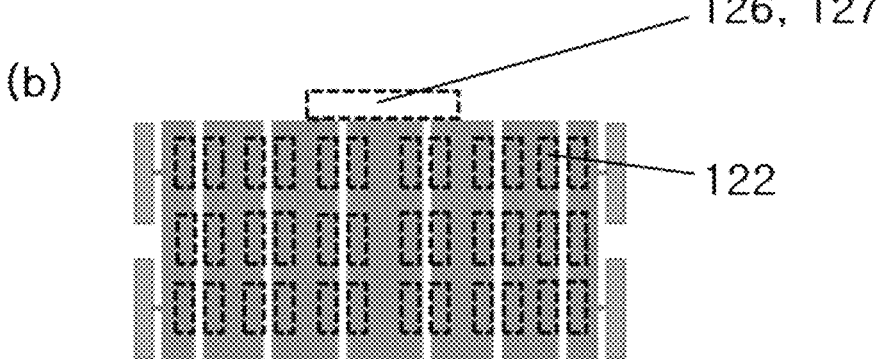
Figure 4:
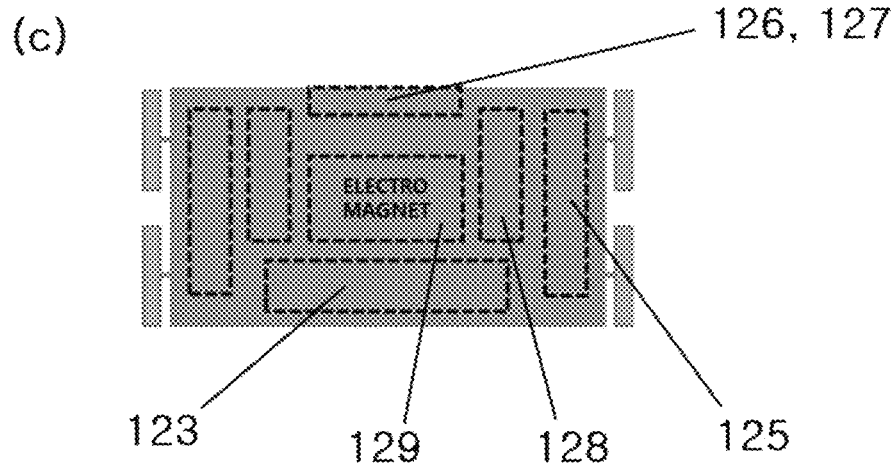

FIGS. 4a to 4c are views more specifically illustrating the cleaning means 120 illustrated in FIG. 2.

Referring to FIGS. 4a to 4c, a pair of guide rails 130 guiding the cleaning means 120 to be linearly moved along the longitudinal direction of the pressure hull is provided on both sides of the anode array 110, and the cleaning means 120 is configured to be moved along the pair of guide rails 130.

FIG. 4a is a front surface view illustrating the cleaning means 120, FIG. 4b is a lower side surface view illustrating the cleaning means 120, and FIG. 4c is a view illustrating an internal structure of the cleaning means 120.

The cleaning means 120 includes at least one anode cleaning hole 121 formed such that the at least one anode cleaning hole 121 corresponds to a position of each anode provided on the anode line, a cleaning apparatus 122 provided for each anode cleaning hole 121, a foreign substance suction portion 123 configured to suction and store foreign substances removed by the cleaning apparatus 122, at least one wheel 124 engaged with the pair of guide rails 130 and configured to be rotated so as to move the cleaning means 120 forward or backward, a rotation motor 125 configured to rotate the at least one wheel 124, a camera 126 configured to capture the anode array 110 in real time, thereby capturing whether foreign substances are removed, a lighting device 127 configured to shine light to the anode array 110, thereby increasing an image quality of the camera 126, an electromagnet 128 applying electromagnetic force so that the cleaning means 120 is capable of being attached to the pressure hull, and a battery configured to supply electric power to the cleaning apparatus 122, the foreign substance suction portion 123, the rotation motor 125, the camera 126, and the lighting device 127.

At this time, by the electromagnetic force of the electromagnet 128 that is provided at a lower surface of the cleaning means 120, the cleaning means 120 is attached to the pressure hull and is not separated from the pressure hull. Furthermore, in a state in which the at least one wheel 124 is engaged with the pair of guide rails 130, the wheel 124 is rotated by rotation power of the rotation motor 125, and the cleaning means 120 is moved along the pair of guide rails 130. In addition, marine organisms or foreign substances removed by the cleaning apparatus 122 are collected through the foreign substance suction portion 123.

That is, in a state in which the cleaning means 120 is attached to the pressure hull by the electromagnet 128, the cleaning means 120 linearly moves along the guide rails 130, and the anode cleaning hole 121 and the cleaning apparatus 122 are removing marine organisms or foreign substances attached to the anode array 110, thereby cleaning the anode array 110.

Although the exemplary embodiments of the present disclosure have been described above, it may be understood by those skilled in the art that a variety of modifications and changes may be made without departing from the concept and scope of the present disclosure disclosed within the range of the following claims.

INDUSTRIAL APPLICABILITY

According to the present disclosure, electric power is generated by using sodium ions dissolved in seawater as a cathode since a chargeable/dischargeable seawater battery is disposed outside a pressure hull, and the electric power may be used as electric power required for an operation of a submarine, so that the present disclosure is a technology to be widely used in the shipbuilding and marine industry, thereby being capable of realizing practical and economic values thereof.

The invention claimed is:

1. A submarine power supply system using a seawater battery, the system comprising:

an anode array formed of at least one anode line comprising a plurality of anodes disposed at a predetermined interval along a longitudinal direction of an outer side surface of a pressure hull between an outer hull and the pressure hull of a submarine;

a cleaning means configured to move along a longitudinal direction of the anode array between the outer hull and the pressure hull, thereby cleaning foreign substances attached to the anode array; and a pair of guide rails provided along both side end portions of the anode array, the pair of guide rails guiding the cleaning means to be capable of being moved along the longitudinal direction of the anode array, wherein, as the anode array is formed such that seawater introduced through a space between the outer hull and the pressure hull is in contact with the anode array, electric power generated by sodium ions accumulated according to a contact between the seawater and the at least one anode line is gathered, thereby providing the electric power as electric power required for propelling the submarine.

2. The system of claim 1, wherein the cleaning means comprises:

at least one anode cleaning hole formed such that the at least one anode cleaning hole corresponds to a position of each anode provided on the at least one anode line;

a cleaning apparatus disposed at each anode cleaning hole;

a foreign substance suction portion configured to suction and store foreign substances removed by the cleaning apparatus;

at least one wheel engaged with the pair of guide rails and configured to be rotated so as to move the cleaning means forward or backward;

a rotation motor configured to rotate the at least one wheel;

a camera configured to capture the anode array in real time;

a lighting device configured to shine light to the anode array;

an electromagnet applying electromagnetic force so that the cleaning means is capable of being attached to the pressure hull; and a battery configured to supply electric power to the cleaning apparatus, the foreign substance suction portion, the rotation motor, the camera, and the lighting device.

3. The system of claim 1, wherein the anode array is electrically connected to an emergency battery provided inside the pressure hull, and the emergency battery is charged by using electric power generated and gathered through the anode array.

4. A submarine power supply method of a submarine power supply system using a seawater battery, the method comprising:

a contacting process in which seawater introduced through a space between an outer hull and a pressure hull of a submarine is in contact with an anode array that is formed of at least one anode line disposed at a predetermined interval along a longitudinal direction of an outer side surface of the pressure hull between the outer hull and the pressure hull; and a supplying process in which electric power is generated as the seawater and the at least one anode line are in contact with each other and sodium ions are accumulated, and a generated electric power is gathered and then is provided as electric power required for propelling the submarine, wherein the system comprises:

the anode array;

a cleaning means configured to move along a longitudinal direction of the anode array between the outer hull and the pressure hull, thereby cleaning foreign substances attached to the anode array; and a pair of guide rails provided along both side end portions of the anode array, the pair of guide rails guiding the cleaning means to be capable of being moved along the longitudinal direction of the anode array.

\* \* \* \* \*